June 15, 1937.  B. FUCHS  2,083,990
MEASURING DEVICE
Filed April 4, 1936
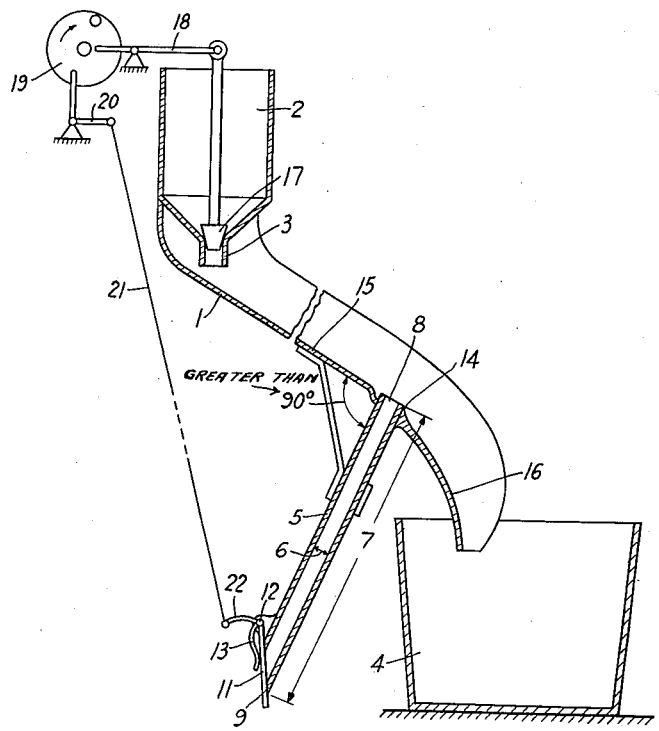
INVENTOR.
BERNHARD FUCHS
BY Chas. Thos. Candy
ATTORNEY.

Patented June 15, 1937

2,083,990

UNITED STATES PATENT OFFICE 2,083,990

MEASURING DEVICE

Bernhard Fuchs, Hohen-Neuendorf, Germany, assignor to Telephon-Apparat Fabrik E. Zwietusch and Company, Berlin, Germany Application April 4, 1936, Serial No. 72,711
In Germany April 17, 1935

6 Claims. (Cl. 221—95)

The invention relates to a device for accurately measuring out small amounts of pulverulent or fine grain materials and the object is to provide a device ensuring a regular flow of the material and for measuring out definite volumes of the latter. A particular advantage of this device lies in avoiding the necessity of weighing such materials on the analytical balance, this involving considerable expense and inconvenience.

According to the invention at least one tube extends into a channel for carrying the material, the width of the tube being small in relation to its length. The tube projects through the channel from below and is inclined at an angle to the channel so as to facilitate the diversion of the flow of the material. The lower end of the tube is cut off obliquely and is closed by a flap operated under the action of a spring or by its own weight.

The drawing shows an embodiment of the device according to the invention, the measuring device being shown diagrammatically in elevation and part in section.

The inclined channel 1 carries at its upper end a container 2 which diminishes in a funnel-like manner in the direction of the channel and has an aperture 3 which can be closed. The lower end of the channel 1 opens into a receptacle 4. In the proximity of the receptacle 4 the channel 1 is pierced through by at least one tube 5. The tube is either rigidly or detachably fixed to the channel and is arranged relative to the longitudinal axis of the channel at an angle greater than 90°. The tube 5 has a considerable length 7 in proportion to its diameter 6. The upper end 8 is finished off approximately at right angles to its longitudinal axis while its lower end 9 is cut off obliquely. On the lower end a flap 11 is pivoted about the rod 12. The flap is pressed against the opening 9 of the tube either by its own weight or by a spring 13. Shortly before the point at which the tube 5 intersects the channel 1 the angle of inclination of the latter is greater than in the upper portion of the channel. Accordingly the sharp edged margin of the tube 5 projects from above the base 15 of the channel so that the material travelling down the channel is diverted at this point. From the point of intersection of the tube and the channel the end portion 16 of the latter leads to the receptacle 4 with an increasing angle of inclination. In place of the channel 1 a tube can be substituted in particular circumstances.

For each measuring operation the desired measure of the material passes into the channel 1 on account of the controlled transitory raising of the closing cone 17. The material streams uniformly along the channel and comes in contact with the edges 14 of the tube and thus fills the measuring tube 5. The excess flows over the aperture of the filled tube and passes into the receptacle 4. From the receptacle 4 the excess material is returned by a transporting device (not shown) or by hand into the container 2. The opening of the closing cone 17 takes place by way of a lever 18 on each rotation of the cam disc 19. The same cam disc can also be used to open the flap 11 by way of the bell crank lever 20, cord 21 and lever 22 so as to remove the material from the measuring tube 5 after each measuring operation. With this device, however, care must be taken that the flap 11 is open later than the raising of the cone 17.

By choosing a tube which possesses considerable length in proportion to its diameter a previously determined quantity can be delivered which deviates very little from the required value. Experiments with sharp edged granular material have shown that for a mass of about one gram, deviations occur amounting to plus or minus 0.18%. In practice this minimum diversion from the desired weight is not exceeded in most cases. It bears no relation to the advantage obtained in the economy in the space taken up.

In the case of pulverulent material it is recommended that a tapping device should be provided for the channel and the measuring tube for the purpose of preventing any blocking of the flow.

What is claimed is:

1. In a device for measuring pulverulent material, a channel down which said material passes, and a tube having one end inserted in the wall of said channel with the inserted end opened to continuously intercept a particular amount of said material as it passes down said channel until the tube is filled, said tube having a small cross sectional area in proportion to its length.

2. In a device for measuring pulverulent material, a channel, means for feeding said material into said channel so that it passes down said channel by gravity, a tube piercing said channel having a continuously opened end projecting into said channel to intercept a particular amount of said material as it passes down said channel, said tube fixed to said channel and inclined to the longitudinal axis of the channel at an angle greater than 90°.

3. In a device for measuring predetermined amounts of pulverulent material, a channel, a hopper at one end of said channel containing said material, means in said hopper for feeding predetermined amounts of said material from said hopper into said channel, said material passing downward along said channel by gravity, a tube piercing said channel, said tube having a length greater than its diameter and fixed to said channel at an angle greater than 90° from the longitudinal axis of said channel, the edge of said tube entering said channel being formed at right angles to the longitudinal axis of said tube, said tube diverting an amount of material from said channel in accordance with its length and diameter and permitting the excess material to pass further along said channel, and means for continuously emptying said tube of material and feeding the material from the hopper to the channel at predetermined intervals.

4. In a pulverulent material measuring device as claimed in claim 2 in which the tube has a pivoted flap at one end which is opened after the tube is filled to permit the measured amount of material to be removed from the tube.

5. In a measuring device, an inclined channel, means for feeding particles of material down said channel, means for taking samples of the material intermittently comprising a pocket in the floor of the channel which fills with the material as it passes over the open end thereof, and means for automatically and intermittently emptying said pocket by opening the lower end thereof.

6. In a measuring device, an inclined channel, means for feeding material particles along said channel, a tube inserted through the floor of said channel and having an open end always in the path of the material, means for normally holding the lower end of said tube closed, said last means operated when the tube is filled with the material to open the lower end of the tube and draw off the material therein.

BERNHARD FUCHS.